(12) United States Patent
Gomez

(10) Patent No.: US 12,386,984 B2
(45) Date of Patent: Aug. 12, 2025

(54) DATA PRIVACY ENHANCING TECHNIQUE SELECTION

(71) Applicant: SAP SE, Walldorf (DE)

(72) Inventor: Laurent Gomez, Pegomas (FR)

(73) Assignee: SAP SE, Walldorf (DE)

( * ) Notice: Subject to any disclaimer, the term of this patent is extended or adjusted under 35 U.S.C. 154(b) by 415 days.

(21) Appl. No.: 17/374,894

(22) Filed: Jul. 13, 2021

(65) Prior Publication Data

US 2023/0029190 A1    Jan. 26, 2023

(51) Int. Cl.
*G06F 21/60* (2013.01)

(52) U.S. Cl.
CPC .... *G06F 21/604* (2013.01); *G06F 2221/2107* (2013.01)

(58) Field of Classification Search
CPC ............... G06F 21/604; G06F 21/6245; G06F 2221/2107
See application file for complete search history.

(56) References Cited

U.S. PATENT DOCUMENTS

| | | | | |
|---|---|---|---|---|
| 8,707,034 B1* | 4/2014 | Ryan | ....................... | G06F 21/10 713/193 |
| 8,881,307 B2* | 11/2014 | Nun | ....................... | G06F 21/604 713/192 |
| 2011/0178930 A1* | 7/2011 | Scheidt | ................. | H04L 63/061 705/50 |
| 2011/0270763 A1* | 11/2011 | Graham, III | ....... | G06Q 20/3829 705/71 |
| 2012/0036348 A1* | 2/2012 | Grodsky | ............. | G06F 21/6209 713/150 |
| 2017/0054796 A1* | 2/2017 | Eda | ....................... | H04L 67/565 |
| 2020/0210377 A1* | 7/2020 | Struck | ................... | G06F 16/125 |
| 2021/0152530 A1* | 5/2021 | Nair | ..................... | H04L 63/0435 |
| 2021/0398625 A1* | 12/2021 | Erard | ..................... | G16H 15/00 |
| 2022/0150065 A1* | 5/2022 | Kishi | ....................... | H04L 9/32 |
| 2022/0382902 A1* | 12/2022 | Panikkar | ............. | G06F 21/6245 |

OTHER PUBLICATIONS

Chen, Z. et al., "Privacy-preserving polynomial interpolation and its applications on predictive analysis," Information Sciences 541 (2020), pp. 259-270.

(Continued)

*Primary Examiner* — Sangseok Park
(74) *Attorney, Agent, or Firm* — Sterne, Kessler, Goldstein & Fox P.L.L.C.

(57) ABSTRACT

Disclosed herein are system, method, and computer program product embodiments for intended usage driven data privacy enhancing technique selection. An embodiment operates by extracting insights from a document. The embodiment determines a security classification for the extracted insights. The embodiment determining a formula for the extracted insights. The embodiment extracts a processing requirement and a data requirement from the formula for the extracted insights. The embodiment maps a privacy enhancing encryption technique to the security classification and processing requirement for the extracted insights. The embodiment executes the privacy enhancing encryption technique corresponding to the security classification and processing requirement for the extracted insights.

20 Claims, 11 Drawing Sheets

100

(56) References Cited

OTHER PUBLICATIONS

Feng, J. et al., "Privacy-preserving computation in cyber-physical-social systems: A survey of the state-of-the-art and perspectives," Information Sciences 527 (2020), pp. 341-355.

Fernando, K. et al., "Mathematical Expression Extraction from Unstructured Plain Text," 24th Int'l. Conf. on Natural Language Processing and Information Systems, 2019, pp. 312-320.

"What is a Mathematical Expression? Definition and Examples", downloaded on May 14, 2024, from https://web.archive.org/web/20210511103040/https://www.math-dictionary.com/mathematical-expression.html (published on or before May 11, 2021).

Surbhi, S., "Difference Between Expression and Equation", downloaded on May 14, 2024, from https://web.archive.org/web/20201129012515/https://keydifferences.com/difference-between-expression-and-equation.html (published on or before Nov. 29, 2020).

* cited by examiner

300

400

| Security Classification Model 235 | | |
|---|---|---|
| Extracted Insight 226 | Data Classification 236 | Security Classification 238 |
| Contractor ID | None | Public |
| Supplier ID | None | Public |
| Contractor Phone Number | Contractor Personal Identifiable Information | Confidential: Only supplier can access information. |
| Contractor Delivery Address | Contractor Personal Identifiable Information | Confidential: Only supplier can access information. |
| Delivery Order status (emergency and regular) | Contractual Information | Confidential: Only contractor and supplier can access information. |
| Purchase Order Amount | Purchase Order | Confidential: Only contractor and supplier can access information. |
| Maximum Purchase Amount | Purchase Order | Confidential: Only contractor and supplier can access information. |
| Due-time Shipping Delay | Contractual Information | Confidential: Only contractor and supplier can access information. |
| Penalties coefficient | Contractual Information | Confidential: Only contractor and supplier can access information. |
| Price of Goods | Purchase Order | Confidential: Only contractor can access information. |

| | Intended Use Classification Model 245 | | | | | |
|---|---|---|---|---|---|---|
| Extracted Insight 226 | KPI 242 | Regulation Policy 243 | Terms and Conditions 241 | Formula 247 | Data Requirement 254 | Processing Requirement 250 |
| Contractor ID | None | None | None | No processing needed | None | None: Serve as a contact reference in PO and Invoice. |
| Supplier ID | None | None | None | No processing needed | None | None: Serve as a contact reference in PO and Invoice. |
| Contractor Phone Number | None | EU Public Procurement Guidelines | None | No processing needed | None | None: Used by the supplier to inform contractor when supplies are shipped. |
| Contractor Delivery Address | None | EU Public Procurement Guidelines | None | No processing needed | None | None: Used by supplier to ensure good delivery. |
| Delivery Order Status | Delivery order status computation | None | 3.1 Emergency Delivery | Emergency OR Regular | Delivery Order status | Boolean comparison: Due-time delivery computation depends on delivery order status (emergency or regular). |
| Due-time Shipping Delay | Percentage of Late Delivery | None | 3.2 Maximum Delivery Time | If Emergency, then ((order date + due-time shipping delay) <= (order date + 48 hours)) = "On Time" If Regular, then ((order date + due-time shipping delay) <= (order date + 5 days)) = "On Time" Else "Delayed" | Due-time Shipping Delay, Order Date, Negotiated shipping delay, Delivery Order status | Numerical comparison: Used to check for compliance with negotiated due-time shipping delay by comparing the actual shipping delay to the negotiated shipping delay in the public procurement contract. |
| Penalty coefficient | Penalty Computation | None | 3.3 Penalty | Penalty coefficient = (0.1 * undelivered units * unit price) + (undelivered units * unit price) | Undelivered Units, Unit Price | Arithmetic operation: In case of penalties enforcement, penalties are linearly computed over penalty coefficient. For example, 10% of the undelivered units in addition to cost of the undelivered units is applied as a penalty. |
| Purchase Order Amount | Check matching quantity | None | 2.1 Purchase Order Amount | If PO amount < max amount; Then "Does not exceed" | Purchase Order Amount, Maximum Purchase Order Amount | Numerical comparison: Check whether the PO amount does not exceed the max agreed Purchase Order Amount. |
| Maximum Purchase Amount | Check matching quantity | None | 2.1 Purchase Order Amount | If PO amount < max amount; Then "Does not exceed" | Purchase Order Amount, Maximum Purchase Order Amount | Numerical comparison: Check whether the PO amount does not exceed the max agreed Purchase Order Amount. |
| Price of Goods | Price of Goods Computation | None | 2.2 Price of Goods | Price = PO amount * unit price | Number of Goods, Unit Price | Arithmetic operation: Used to compute the overall price of the Purchase Order Amount. |

| Privacy Enhancing Technique Selection Model 230 ||||| 
| Extracted Insight 226 | Security Classification 238 | Data Requirement 254 | Processing Requirement 250 | Privacy Enhancing Technique Insight List 258 |
|---|---|---|---|---|
| Contractor ID | Public | None | None: Serve as a contact reference in PO and Invoice. | None |
| Supplier ID | Public | None | None: Serve as a contact reference in PO and Invoice. | None |
| Contractor Phone Number | Confidential: Only supplier can access information. | None | None: Used by the supplier to inform contractor when supplies are shipped. | Symmetric Encryption |
| Contractor Delivery Address | Confidential: Only supplier can access information. | None | None: Used by supplier to ensure good delivery. | Symmetric Encryption |
| Delivery Order status (emergency and regular) | Confidential: Only contractor and supplier can access information. | Delivery Order status | Boolean comparison: Due-time delivery computation depends on delivery order status (emergency or regular). | Garbled Circuit |
| Purchase Order Amount | Confidential: Only contractor and supplier can access information. | Purchase Order Amount, Maximum Purchase Order Amount | Numerical comparison: Check whether the Purchase Order amount exceeds the max agreed Purchase Order Amount. | Order-Preserving Encryption |
| Maximum Purchase Amount | Confidential: Only contractor and supplier can access information. | Undelivered Units, Unit Price | Numerical comparison: Check whether the Purchase Order amount exceeds the max agreed Purchase Order Amount. | Order-Preserving Encryption |
| Due-time Shipping Delay | Confidential: Only contractor and supplier can access information. | Due-time Shipping Delay, Order Date, Negotiated shipping delay, Delivery Order status | Numerical comparison: Used to check for compliance with negotiated due-time shipping delay by comparing the actual shipping delay to the negotiated shipping delay in the public procurement contract. | Order-Preserving Encryption |
| Penalty coefficient | Confidential: Only contractor and supplier can access information. | Undelivered Units, Unit Price | Arithmetic operation: In case of penalties enforcement, penalties are linearly computed over penalty coefficient. For example, 10% of the undelivered units in addition to cost of the undelivered units is applied as a penalty. | MPC |
| Price of Goods | Confidential: Only contractor can access information. | Number of Goods, Unit Price | Arithmetic operation: Used to compute the overall price of the Purchase Order Amount. | MPC |

| Extracted Insight 226 | Privacy Enhancing Technique Insight List 258 | Formula 247 | Supplier Access to Extracted Insight 226 | Contractor Access to Extracted Insight | Public Access to Extracted Insight |
|---|---|---|---|---|---|
| Contractor ID | None | No processing needed | 65462 | 65462 | 65462 |
| Supplier ID | None | No processing needed | 58948 | 58948 | 58948 |
| Contractor Phone Number | Symmetric Encryption | No processing needed | 345-1645-6534 | Confidential | Confidential |
| Contractor Delivery Address | Symmetric Encryption | No processing needed | 564 K St, Alexandria, Virginia 22314 | Confidential | Confidential |
| Delivery Order Status | Garbled Circuit | Emergency OR Regular | Emergency OR Regular | Emergency OR Regular | Confidential |
| Due-Time Shipping Delay | Order-Preserving Encryption | If Emergency, then ((order date + due-time shipping delay) <= (order date + 48 hours)) = "On Time"; If Regular, then ((order date + due-time shipping delay) <= (order date + 5 days)) = "On Time"; Else "Delayed" | On Time OR Delayed | On Time OR Delayed | Confidential |
| Purchase Order Amount | Order-Preserving Encryption | If PO amount < max amount; Then "Does not exceed" | Does not exceed | Does not exceed | Confidential |
| Maximum Purchase Order Amount | Order-Preserving Encryption | If PO amount < max amount; Then "Does not exceed" | Does not exceed | Does not exceed | Confidential |
| Penalty coefficient | MPC | Penalty coefficient = (0.1 * undelivered units * unit price) + (undelivered units * unit price) | $999 | $999 | Confidential |
| Price of Goods | MPC | Price = PO amount * unit price | Confidential | $9990 | Confidential |

Protected Insights 262

Fig. 7

DATA PRIVACY ENHANCING TECHNIQUE SELECTION

BACKGROUND

Data privacy regulations place non-negotiable legal restrictions on the nature and extent of data collection and dissemination. Various data privacy enhancing techniques have surfaced in light of these data privacy regulations. However, compliance with data privacy regulations may create challenges in the usability of protected data. As a result, data privacy enhancing techniques suffer from limited and targeted post-processing capabilities. Therefore, the context in which each data privacy enhancing technique should be used is variable based on the intended usage of protected data.

BRIEF DESCRIPTION OF THE DRAWINGS

The accompanying drawings are incorporated herein and form a part of the specification.

FIG. 4 is an example table illustrating a system for determining the security classification for extracted insights from a document, according to some embodiments.

FIG. 5A is an example table illustrating an intended use classification model for determining the intended usage of extracted insights, according to some embodiments.

FIG. 6 is an example table illustrating data privacy enhancing technique selection, according to some embodiments.

FIG. 7 is an example table illustrating a system for encrypting extracted insights using corresponding selected privacy enhancing techniques, according to some embodiments.

In the drawings, like reference numbers generally indicate identical or similar elements. Additionally, generally, the left-most digit(s) of a reference number identifies the drawing in which the reference number first appears.

DETAILED DESCRIPTION

Figure 1:
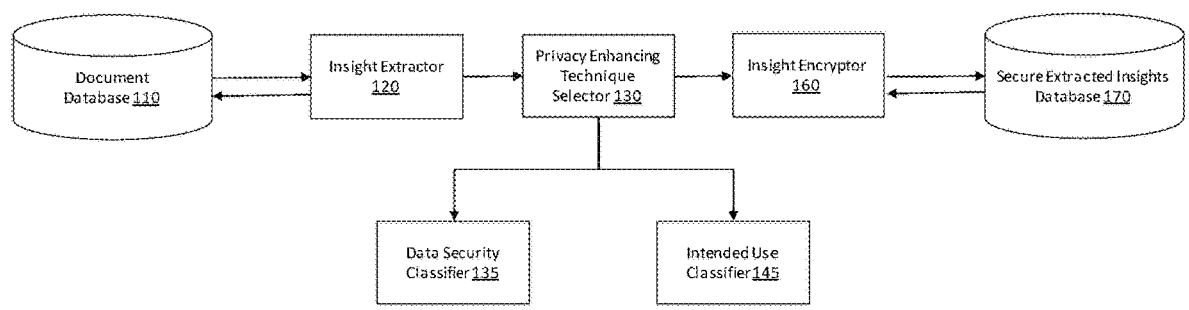
FIG. 1 is a block diagram illustrating a system architecture for data privacy enhancing technique selection, according to some embodiments.

Provided herein are system, apparatus, device, method and/or computer program product embodiments, and/or combinations and sub-combinations thereof, for data privacy enhancing technique selection. With the emergence of mass data collection and dissemination, many global data privacy regulations have surfaced to regulate and safeguard the transfer of data. For example, the European Union enacted the General Data Protection Regulation (GDPR) in 2018 to place regulations upon the manner in which organizations collect and disseminate data related to European Union residents and citizens. These regulations include how organizations may process data (e.g., collecting, recording, organizing, structuring, storing, using, deleting data). Furthermore, the GDPR specifies the nature of the data that organizations may collect and disseminate (e.g., personal data, names, email addresses, location information, biometric data, web cookies).

The GDPR regulates how organizations process data protected under the GDPR. For example, processing protected data must be legally compliant and transparent to the data subject and used for legitimate purposes explicitly specified to the data subject. Organizations can collect and process only as much data as necessary for the purposes specified and in a manner ensuring appropriate security and confidentiality. The organization is responsible for demonstrating GDPR compliance. Regulatory agencies may levy strict penalties and heavy fines for violation of the privacy and security standards set forth in the GDPR.

Similarly, California passed the California Consumer Privacy Act (CCPA) in 2018 to place regulations on the manner in which data certain U.S. companies collect and disseminate data in California. The CCPA aims to safeguard consumer data privacy for California residents in a manner similar to the GDPR. The CCPA sets forth guidelines allowing consumers in California to view CCPA-protected information that a company has collected and stored, along with the third parties who have received such information. Similar to the GDPR, the CCPA mandates hefty fines on qualifying organizations for non-compliance.

With the continuing emergence of data privacy regulations, various privacy preserving solutions (e.g., secure multi-party computation (MPC), data anonymization, differential privacy, order-preserving encryption, FHE) have been developed to ensure compliance with the regulations. While these privacy preserving solutions enable compliance with data privacy regulations, each technique may target the nature of protected data and its respective processing in a different and limited manner. For example, MPC allows entities to use protected data in a limited manner while the data is still encrypted. To ensure compliance with data privacy regulations, the goal of MPC is directed to the manner in which protected data is processed rather than how specific categories of protected data (e.g., integer, boolean, string) are encrypted. Similarly, the goal of order-preserving encryption scheme (OPES) is directed to comparing numerical operations to be directly applied on encrypted data without decrypting the operands.

On the other hand, the goal of data anonymization is directed to transforming the nature of data itself to ensure compliance with data privacy regulations. Data anonymization enables removal of personally identifiable information from data sets to ensure the data subjects may remain anonymous. Similarly, the goal of differential privacy is directed to withholding information describing certain individuals from whom data is collected. Differential privacy is a system for aggregating information about a dataset by describing patterns in a group while withholding information about individuals belonging to the dataset.

While these privacy enhancing techniques enable compliance with data privacy regulations, each privacy preserving technique may be useful in some contexts while compromising the usability of protected data in other contexts. Each privacy enhancing technique faces unique limited and targeted post-processing capabilities. Accordingly, data scientists face difficulty in selecting the right data privacy preserving tool that maximizes the usability of encrypted data based on the particular data processing needs or intended usage of protected data in diverse contexts. Therefore, a technical solution is needed to optimize compliance with data privacy regulations and the usability of protected data by automating selection of privacy enhancing techniques based on the intended usage and data privacy requirements for particular data in each unique context.

FIG. 1 is a block diagram illustrating a system architecture for data privacy enhancing technique selection, according to some embodiments. System 100 includes document database 110, insight extractor 120, privacy enhancing technique selector (PET selector) 130, data security classifier 135, intended use classifier 145, insight encryptor 160, and secure extracted insights database 170.

Document database 110 may be a database that stores documents. System 100 may retrieve documents from document database 110 to perform insight extraction, privacy enhancing technique selection, and insight encryption. Insight extractor 120 may retrieve documents from document database 110. Insight extractor 120 may use data preparation and data cleaning techniques known to a person of ordinary skill in the art to segment the document retrieved from document database 110 and place the document in condition for insight extraction. Insight extractor 120 may use data mining techniques to extract key insights that PET selector 130 may use to perform privacy enhancing technique selection.

PET selector 130 may identify the appropriate privacy enhancing technique corresponding to the retrieved extracted insights. Data security classifier 135 may retrieve extracted insights to determine a security classification for each of the extracted insights. By determining the security classification of an extracted insight, data security classifier 135 ensures the extracted insight meets data privacy requirements set forth in data privacy regulations based on a designated security classification. Data security classifier 135 may use machine learning techniques known to a person of ordinary skill in the art to determine a security classification for an extracted insight.

Intended use classifier 145 may determine the intended usage of an extracted insight, according to some embodiments. Intended use classifier 145 may determine a formula that corresponds to an extracted insight and extract processing requirements and data requirements for the corresponding formula, according to some embodiments. By determining the processing requirement of an extracted insight, intended use classifier 145 enables customized processing for an extracted insight depending on the context of its respective processing requirement, according to some embodiments. PET selector 130 may identify the privacy enhancing technique corresponding to the security classification determined by data security classifier 135 and the processing and data requirements determined by intended use classifier 145.

Insight encryptor 160 may process and encrypt the privacy enhancing technique corresponding to an extracted insight selected by PET selector 130. Insight encryptor 160 may store the encrypted extracted insights in a secure extracted insights database 170. The privacy enhancing technique for the corresponding extracted insight may ensure the corresponding extracted insight complies with data privacy regulations and other confidentiality concerns based on its respective security classification while still enabling the processing of the protected data based on the unique processing requirement of the extracted insight. Accordingly, this privacy enhancing technique solution provides a technical solution to ensure compliance with data privacy regulations while increasing the usability of protected extracted insights.

Document database 110 and secure extracted insights database 170 may each be a data store. Document database 110 and secure extracted insights database 170 may each be a relational database, a NoSQL database or other horizontally scaling database, or any other database adhering to a suitable database design methodology, or any combination thereof. In an embodiment, the data store may implement a centralized storage area network (SAN), network-attached storage (NAS), redundant array of independent disks, and/or any other configuration of storage devices to supply sufficient storage capacity to store database tables and supporting structures. Sufficient storage may alternatively exist in any other physically attached magnetic storage, cloud storage, or additional storage medium. In an embodiment, the data store may deploy a hard-disk interface, such as ATA, SATA, SCSI, SAS, and/or fibre for interfacing with storage mediums.

Figure 2:
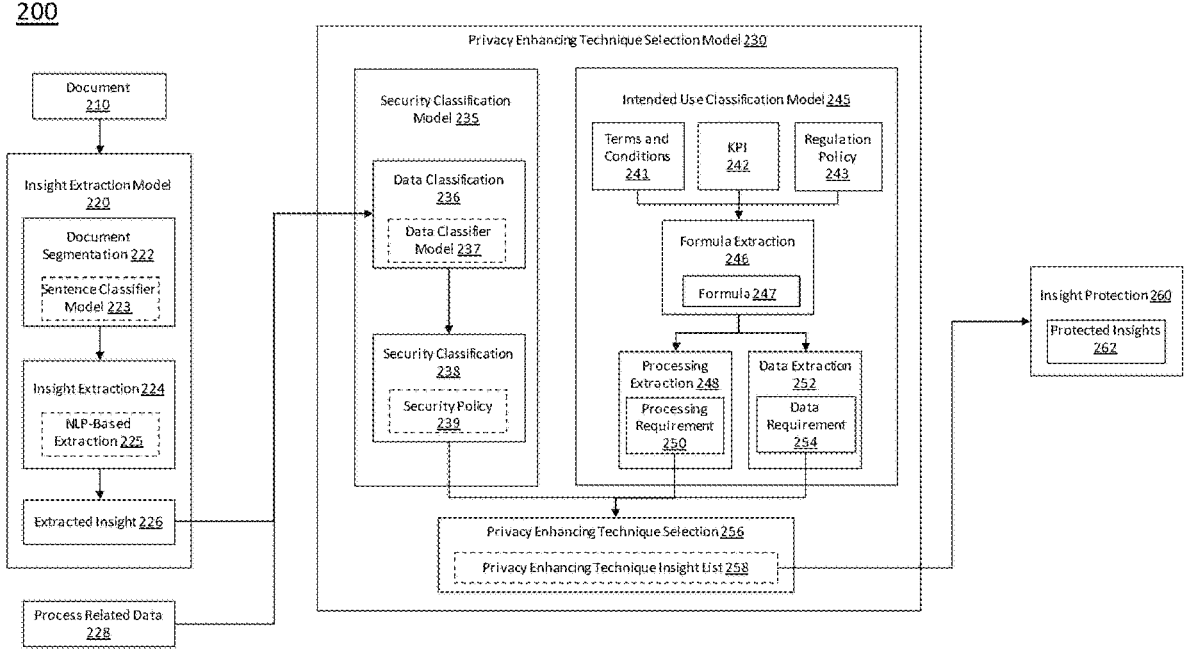
FIG. 2 is a block diagram illustrating a system for data privacy enhancing technique selection, according to some embodiments.

FIG. 2 is a block diagram illustrating a system for data privacy enhancing technique selection, according to some embodiments. FIG. 2 is described with reference to FIG. 1. Insight extractor 120 may retrieve document 210 from document database 110. Insight extractor 120 may retrieve extracted insight 226 from document 210. Insight extractor 120 may rely on data mining techniques known to a person of ordinary skill in the art to extract insights from document 210. Insight extractor 120 may perform document segmentation 222 and insight extraction 224 to retrieve extracted insight 226.

Document segmentation 222 includes data preparation and data cleaning techniques known to a person of ordinary skill in the art. Prior to retrieving any particular data from document 210, insight extractor 120 may clean the data in document 210 by removing or correcting data in document 210 that would place document 210 in condition for further insight extraction 224. Upon cleaning the data in document 210, insight extractor 120 may perform document segmentation 222 by using data preparation techniques. These data preparation techniques can include document segmentation techniques such as sentence classifier model 223. Insight extractor 120 may use sentence classifier model 223 to split document 210 into segments classifying various sentences. Each segment may have a relevant meaning or purpose to enable insight extractor 120 to complete insight extraction 224. While insight extractor 120 may use sentence classifier model 223 to complete document segmentation 222, insight extractor 120 may also split document 210 into segments categorized by words, sentences, topics, phrases, or other units of information depending on the nature of the extracted insight 226 to be retrieved.

By performing document segmentation 222, insight extractor 120 may have placed document 210 in condition to process insight extraction model 220 in order to extract insights from document 210. Insight extractor 120 may extract insights from document 210 using artificial intelligence techniques, including, but not limited to, K-nearest neighbors, regression, or natural language processing (NLP). Insight extractor 120 may use any data mining techniques for extracting insights from document 210 known to a person of ordinary skill in the art. Upon performing document segmentation 222 and applying insight extraction model 220, insight extractor 120 may retrieve extracted insight 226 from document 210. Insight extractor 120 may also store process related data 228 extracted during insight extraction 224 and document segmentation 222, including data based on the terms and conditions of document 210.

PET selector 130 may perform PET selection model 230 to select a privacy enhancing technique corresponding to extracted insight 226. Extracted insight 226 may include one or more extracted insights, individual extracted insights, and/or may be grouped into a category of extracted insights. PET selection model 230 may include security classification model 235 and intended use classification model 245 to select the appropriate privacy enhancing technique for extracted insight 226. Data security classifier 135 may perform security classification model 235 to determine the targeted level of data protection (e.g., public, private, confidential) for the extracted insight 226 retrieved from document 210. Additionally, intended use classifier 145 may perform intended use classification model 245 to determine the required processing needs for extracted insight 226 (e.g., computing an average, comparison of numerical or Boolean values, etc.).

PET selector 130 may perform security classification model 235 to classify the security level for extracted insight 226. Security classification model 235 may include data classification 236 and security classification 238. PET selector 130 may perform data classification model 237 using artificial intelligence techniques known to a person of ordinary skill in the art to determine the data classification 236 corresponding to extracted insight 226. For example, PET selector 130 may use data classification model 237 to classify extracted insight 226 as personal identifiable information (e.g., phone number, e-mail, name), contractual information, purchase order information, and/or public information.

PET selector 130 may use a rule-based security classification 238 to classify the level of security for extracted insight 226. Security classification 238 may include the data classification 236 for a particular extracted insight 226 to determine security classification 238. Data security classifier 135 may also use a security policy 239 to determine the security classification 238 of extracted insight 226. Using the data classification 236 and/or security policy 239 of extracted insight 226, PET selector 130 may determine the security classification 238 for extracted insight 226.

Intended use classification model 245 may include formula extraction 246, processing extraction 248, and/or data extraction 252. Intended use classifier 145 may use intended use classification model 245 to determine formula 247 based on pre-determined key performance indicators (KPI) 242, terms and conditions 241, and/or regulation policy 243. KPI 242 may be a mathematical function or a formula describing a calculation, and various other metadata associated with KPI 242. KPI 242 may represent an integer, decimal, floating point number, string, or other text. Metadata associated with KPI 242 may include contextual information and a formal language query (or queries) used to generate KPI 242. According to an embodiment, KPI 242 may be data driven indicators statically drawn from data across a wide-array of data-driven applications. According to some embodiments, KPI 242 may be dynamically retrieved by machine learning techniques that extract mathematical expressions from textual sources such as document 210.

Intended use classifier 145 may retrieve terms and conditions 241 to determine a formula 247 associated with extracted insight 226. Intended use classifier 145 may use the process related data 228 associated with terms and conditions 241 to determine the formula 247 associated with extracted insight 226. Intended use classifier 145 may associate the segments extracted from document segmentation 222 to identify the relevant terms and conditions associated with extracted insight 226.

Intended use classifier 145 may retrieve regulation policy 243 to determine a formula 247 for extracted insight 226. Intended use classifier 145 may analyze the requirements for compliance with regulation policy 243 in deriving formula 247. In some embodiments, regulation policy 243 may be the same as security policy 239. In some embodiments, regulation policy 243 may be based on the security classification 238 for extracted insight 226.

Intended use classifier 145 may perform formula extraction 246 to extract a mathematical expression from terms and conditions 241, KPI 242, and/or regulation policy 243. Formula 247 may be the mathematical expression that intended use classifier 145 extracted from terms and conditions 241, KPI 242, and/or regulation policy 243. Based on the extracted formula 247, intended use classifier 145 may perform processing extraction 248 to determine the processing requirement 250 for extracted insight 226. Based on the extracted formula 247, intended use classifier 145 may perform data extraction 252 to determine the data requirement 254 for extracted insight 226. Processing extraction 248 and data extraction 252 may incorporate machine learning techniques, including natural language processing, to extract processing requirement 250 and data requirement 254. Processing requirement 250 may be the performed operation represented by formula 247 (e.g., sum, average, mean, calculation). Data requirement 254 may be the function input parameters required to process formula 247.

Upon determining security classification 238, processing requirement 250, and/or data requirement 254, PET selector 130 may perform PET selection 256. Based on the security classification 238 and processing requirement 250, PET selector 130 may select the most appropriate privacy enhancing technique for extracted insight 226 (e.g., zero-knowledge proofs, multi-party computation, fully homomorphic encryption, order preserving encryption, trusted execution environments, differential privacy). PET selector 130 may associate extracted insight 226 with the appropriate privacy enhancing technique. PET selector 130 may generate a PET insight list 258 representing a list of each extracted insight 226 with its mapping to the relevant privacy enhancing technique.

Insight encryptor 160 may execute the selected privacy enhancing technique for extracted insight 226. Once insight encryptor 160 processes and encrypts extracted insight 226, the resulting value may be protected insight 262. Protected insight 262 may also include an extracted insight 226 that did not have a security classification 238 and/or processing requirement 250. Privacy preserving credentials may be generated to protect protected insight 262. Insight encryptor 160 may use data requirement 254 to apply the function input parameters to the selected privacy enhancing technique for extracted insight 226. Insight encryptor 160 may encrypt and store protected insight 262 in secure extracted insights database 170.

Figure 3:
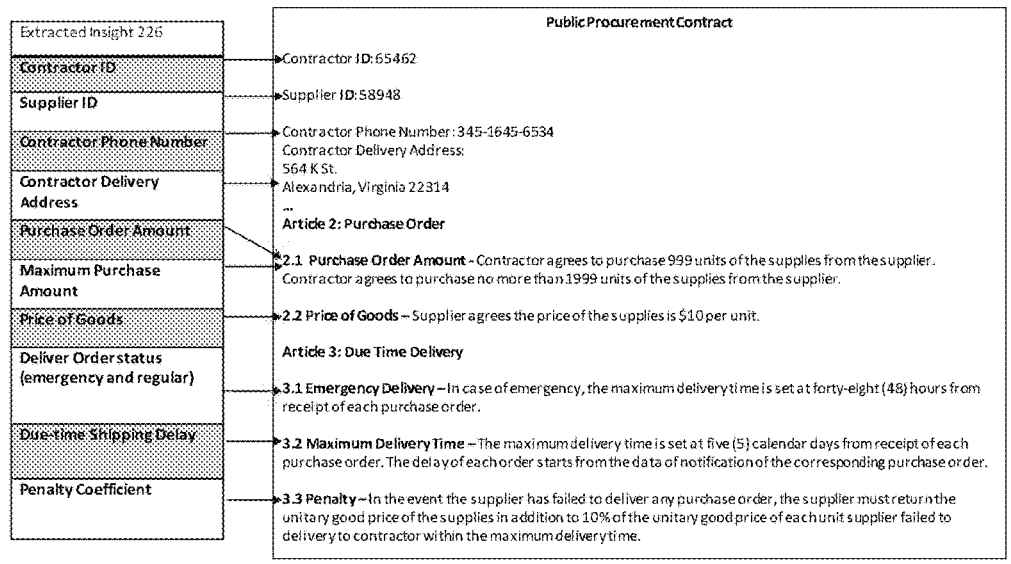
FIG. 3 is an example illustrating a system for extracting insights from a document, according to some embodiments.

FIG. 3 is an example illustrating a system for extracting insights from a document, according to some embodiments. FIG. 3 is described with reference to FIG. 1 and FIG. 2. To describe the features and functions of system 100 and system 200, reference is made to an example public procurement scenario. Public procurement is subject to data privacy regulations as set forth in the European Union directives for public procurement. This example illustrates employing the privacy enhancing technique selection using a public procurement contract.

The public procurement contract may require upfront data mining into the document to gain key insights (e.g., the terms and conditions of the purchase order, outbound delivery process, supplier and contractor information) set forth in the contract. To use insight extraction model 220, insight extractor 120 may first receive document 310 from document database 110. Document 310 may be a public procurement contract containing non-negotiable legal obligations, terms, and conditions. Upon retrieving document 310 from document database 110, insight extractor 120 may perform document segmentation 222 techniques to extract key insights from document 310. Insight extractor 120 may first perform data cleaning techniques to place document 310 in condition for insight extractor 120 to retrieve extracted insight 226.

Upon completing data cleaning techniques with document 310, insight extractor 120 may process data preparation techniques such as document segmentation. Document segmentation classifies the context of each sentence (e.g., which term and condition is defined in a sentence). Sentence classifier model 223 may be performed based on heuristics (e.g., the regular expression of a sentence or parts of speech) or based on sentence semantic similarities (e.g., K-Nearest Neighbors algorithm). Based on reference sentences, insight extractor 120 may evaluate the similarity of each sentence in document 310.

In this case, insight extractor 120 may split the document into segments based on topics or sentences. For example, insight extractor 120 may split document 310 into segments representing the various topics or sections. In some embodiments, insight extractor 120 may split document 310 into segments for each sentence wherein each segment may be a sentence or clause representing different terms and conditions. Insight extractor 120 may generate a list of labels per sentence, such as, "2.1 Purchase Order Amount," "2.2 Price of Goods," "3.1 Emergency Delivery," "3.2 Maximum Delivery Time," and/or "3.3 Penalty." For example, the sentence "in case of emergency, the maximum delivery time is set at forty (48) hours from receipt of each purchase order," would be labeled as "Emergency Delivery." The "Emergency Delivery" label is determined based on the identification of the word "emergency" in the sentence and the word delivery is determined by its proximity to the word "emergency" within the reference sentence.

Using document segmentation 222, insight extractor 120 has placed document 310 in condition for extracting insights. In the case of a public procurement scenario, suppliers and contractors generally consider certain recurring variables when negotiating the terms and conditions of the purchase order and the due-time outbound delivery process. For example, when negotiating the terms and conditions of the purchase order, parties may consider the purchase order amount, the price of goods, and/or the maximum purchase amount.

Once a purchase order is emitted by a recipient to a supplier, the supplier must fulfill certain contractual obligations regarding good delivery. If the supplier fails to comply with these legal obligations, the supplier may be subject to stiff penalties. There are certain variables common when negotiating outbound delivery. Relevant information to outbound delivery may include the delivery order status (e.g., emergency or regular delivery schedule), due-time shipping delay, and a penalty coefficient.

To ensure compliance with the European Union Public Procurement Guidelines, insight extractor 120 may need to extract insights such as a contractor ID and supplier ID. In order to fulfill the obligations of the public procurement contract, insight extractor 120 may extract other insights such as the contractor's phone number and the contractor's delivery address to ensure the supplier fulfills its good delivery obligations.

Once each segment of document 310 has been labeled, insight extractor 120 may use NLP-based extraction 225 to perform insight extraction 224. Using the same clause as an illustration, insight encryptor 160 may extract the due-time delivery delay information, 48 hours, in the case of an emergency. This may be detected by processing a regular expression on the example sentence from document 310 and detecting the number "48" and checking that the number is followed by the word "hours," "days," or "months." In some embodiments, insight encryptor 160 can determine the due-time delivery delay by using parts of speech processing to detect a number followed by a noun.

Insight extractor 120 may use NLP-based extraction 225 to extract insights for the purchase order from the segments labeled "2.1 Purchase Order Amount" and "2.2 Price of Goods" including the purchase order amount, the price of goods, and/or the maximum purchase amount. Insight extractor 120 may then use NLP-based extraction 225 to extract insights for the due-time outbound delivery process from the segment of document 310 labelled "3.1 Emergency Delivery," "3.2 Maximum Delivery Time," and/or "3.3 Penalty." Finally, using NLP-based extraction 225, insight extractor 120 may retrieve general contractor and supplier information, such as the contractor ID, supplier ID, and contractor phone number and delivery address, from the top of document 310, in which supplier and contractor information may typically be located in a public procurement contract. Upon completion of document segmentation 222 and insight extraction 224, insight extractor 120 may store extracted insight 226 in a database.

FIG. 4 is an example table illustrating a system for determining the security classification for extracted insights from a document, according to some embodiments. FIG. 4 is described with reference to FIG. 1, FIG. 2, and FIG. 3. Upon retrieving extracted insight 226 from document 310, data security classifier 135 may use security classification model 235 to determine the security classification 238 for extracted insight 226. To determine security classification 238, data security classifier 135 may first determine the data classification 236 for extracted insight 226.

Using artificial intelligence techniques known to a person of ordinary skill in the art, data security classifier 135 may determine a data classification 236 for extracted insight 226. Data security classifier 135 may then use data classification 236 and a security policy 239 to determine the security classification model 235 for extracted insight 226. The security policy 239 may include the intentions of contractual parties, a data privacy regulation, a cybersecurity policy, or another security policy restricting the collection and dissemination of data.

Using artificial intelligence techniques, data security classifier 135 may determine that the contractor phone number and contractor delivery address are the contractor's personal identifiable information because information such as names, addresses, and contact information are oftentimes designated as personal identifiable information. Data privacy regulations oftentimes regulate the disclosure of personal identifiable information. Therefore, using the data classification 236, data security classifier 135 may designate a confidential security classification 238 for the contractor ID and supplier ID. Accordingly, only the supplier may be able to access this information.

Using artificial intelligence techniques, data security classifier 135 may determine the extracted insight 226 for the purchase order amount, maximum purchase amount, and price of goods belong to a data classification 236 representing purchase order. Using the data classification 236 for extracted insight 226, data security classifier 135 may determine that the security classification 238 for purchase order amount and maximum purchase amount should be designated as confidential and that only the contractor and supplier may access this information to fulfill their respective obligations for the purchase order. On the other hand, based on data classification 236 and other pre-determined rules, data security classifier 135 may determine only the contractor needs to access the extracted insight 226 representing the price of goods to ensure the contractor fulfills its payment obligations to the supplier in accordance with the purchase order as represented by data classification 236.

Using artificial intelligence techniques, data security classifier 135 may determine the extracted insight 226 for delivery order status, due-time shipping delay, and the penalty coefficient belong to a data classification 236 representing contractual information. Using the data classification 236 for extracted insight 226, data security classifier 135 may determine that the security classification 238 for delivery order status, due-time shipping delay, and the penalty coefficient should be designated as confidential and that only the contractor and supplier may access this information to fulfill their respective contractual obligations for outbound delivery outlined in document 310.

FIG. 5A is an example table illustrating an intended use classification model, according to some embodiments. FIG. 5A is described with reference to FIG. 1, FIG. 2, FIG. 3, and FIG. 4. Intended use classifier 145 may use the intended use classification model 245 to determine intended usage of extracted insight 226. To determine the intended usage of extracted insight, intended use classifier 145 may use formula extraction 246 to determine a formula 247 that best represents the intended usage of extracted insight 226. To derive formula 247, intended use classifier 145 may consider the terms and conditions 241 of document 310, KPI 242, and/or regulation policy 243.

Upon selecting a formula 247, intended use classifier 145 may use processing extraction 248 to determine the processing requirement 250 and data extraction to determine the data requirement 254 for extracted insight 226. Processing requirement 250 may be the performed operation represented by formula 247 (e.g., sum, average, mean, calculation). Data requirement 254 may be the function input parameters required to process formula 247.

Accordingly, in the public procurement context, suppliers and public contractors may consider terms and conditions as strictly confidential. Nevertheless, without sharing the details of individual transactions, contractually involved parties may still want to enable third parties (e.g. general public, market analysts, call for tender candidates) to compute KPIs including percentage of late delivery, penalty computation for late delivery, price of goods computation, etc. Moreover, suppliers and public contractors may generally consider data privacy considerations in the context of the European Public Procurement Guidelines. Finally, suppliers and public contractors may need to consider the terms and conditions 241 of a document 210 to determine a formula 247 that best represents the intended use of extracted insight 226 from a document 210.

When performing formula extraction 246, intended use classifier 145 may use KPI 242 related to purchase orders and/or due-time delivery, regulation policy 243 based on the European Union Public Procurement Guidelines, and/or the terms and conditions 241 from document 310 to generate a formula 247 representing a mathematical expression for extracted insight 226.

For certain types of information, such as personally identifiable information or public information, there may be no applicable KPI 242, regulation policy 243, and/or terms and conditions 241 relevant for intended use classifier 145 to process for formula extraction 246, according to some embodiments. Accordingly, intended use classifier 145 may determine formula extraction 246 is not applicable to the extracted insight 226 associated with contractor ID and supplier ID because these insights have a public security classification 238. Similarly, because there is no processing involved with the contractor's personal identifiable information (e.g., the contractor phone number and contract delivery address), intended use classifier 145 may determine there is no applicable formula 247 for the extracted insight 226 associated with the contractor's personal identifiable information.

On the other hand, suppliers and contractors may generally have applicable KPI 242, terms and conditions 241, and/or regulation policy 243 relevant to the extracted insight 226 associated with the data classification 236 for purchase order and contractual information. Intended use classifier 145 may use the process related data 228 extracted during insight extraction 224 to determine the relevant terms and conditions 241 to process for formula extraction 246.

Figure 5B:
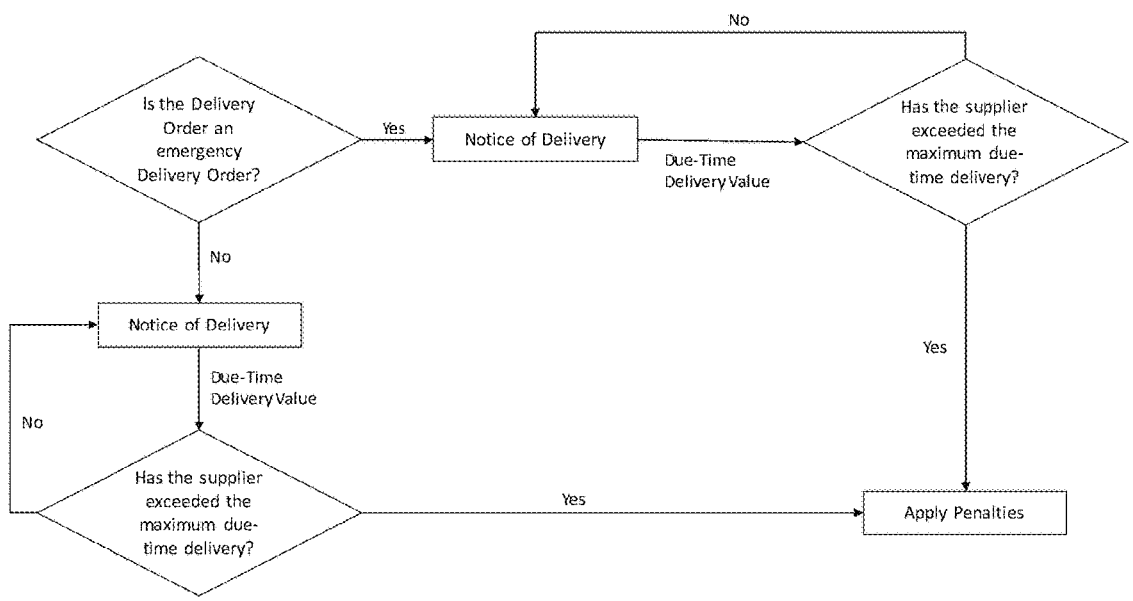
FIGS. 5B and 5C are example flow charts illustrating formula extraction and processing extraction for extracted insights, according to some embodiments.

Referring to FIG. 5B, intended use classifier 145 may use machine learning techniques to determine the data requirement 254 and processing requirement 250 extracted from formula 247 for the extracted insight 226 associated with due-time delivery. Intended use classifier 145 may first use the process related data 228 associated with terms and conditions 241 to determine the formula 247 for delivery order status, due-time shipping delay, and penalty coefficient. For the delivery order status, intended use classifier 145 may use the sentence segment associated with section "3.1 Emergency Delivery" from document 310 to extract formula 247 for the delivery order status extracted insight 226. Intended use classifier 145 may then use a delivery order status computation KPI 242 associated with emergency delivery data generally extracted from public procurement contracts. Using the delivery order status KPI 242 and terms and conditions 241 sentence segment for section "3.1 Emergency Delivery," intended use classifier 145 may use formula extraction 246 to determine the formula 247 for the delivery order status extracted insight 226 would be as follows:

Formula 247 (Purchase Order Status)=emergency OR regular

Intended use classifier 145 may then use processing extraction 248 to extract the process requirement 250 and data extraction 252 to extract the data requirement 254 for the formula 247 associated with the purchase order status extracted insight 226. Using machine learning techniques, intended use classifier 145 may determine the processing requirement 250 for the formula 247 associated with the purchase order status extracted insight 226 would involve a Boolean comparison. Particularly, intended use classifier 145 may determine the Boolean comparison would require a comparison of whether the delivery order status is emergency or regular and that the due-time delivery depends on whether this constraint is met. Additionally, intended use classifier 145 may determine the data requirement 254 used to process the formula 247 associated with the purchase order status would require a boolean input of the delivery order status (e.g., emergency or regular status). As shown in FIG. 5B, the first consideration in a due-time delivery negotiation is whether the purchase order has an emergency status or regular status, which requires a Boolean comparison.

If the delivery order status is an emergency status, then the next consideration in ensuring good delivery is whether the due-time delivery has exceeded the due-time delivery in the case of an emergency as set forth in document 310. Otherwise, the next consideration is whether the due-time delivery has exceeded the due-time delivery under regular conditions as set forth in document 310.

The intended use classifier 145 may then determine the formula 247 for the due-time shipping delay extracted insight 226. Intended use classifier 145 may determine the KPI 242 associated with due-time shipping delay is the percentage of late delivery. In some embodiments, intended use classifier 145 may use the percentage of late delivery KPI 242 to check for compliance with negotiated due-time shipping delays based on the average of previous shipping delays. In some embodiments, intended use classifier 145 may determine the formula 247 for the due-time shipping delay based on the terms and conditions 241 set forth in document 310. As shown in FIG. 5B, once the intended use classifier 145 ascertains the delivery order status for the purchase order, the intended use classifier 145 may then determine the formula 247 for the due-time shipping delay based on the delivery order status. Accordingly, intended use classifier 145 may use formula extraction 246 to extract the following formula 247 for the due-time shipping delay extracted insight 226:

Formula 247 (Due-Time Shipping Delay)=$^{if}$ Delivery Order Status="Emergency", then Order Date+Due-Time Shipping Delay<=Order Date+ 48 Hours="On Time"

$^{if}$ Delivery Order Status="Regular", then Order Date+Due-Time Shipping delay<=Order Date+5 Days="On Time"Else: "Delayed"

Intended use classifier 145 may then use processing extraction 248 to extract the processing requirement 250 and data extraction 252 to extract the data requirement 254 for the formula 247 associated with the due-time delivery delay extracted insight 226. Using machine learning techniques, intended use classifier 145 may determine the processing requirement 250 for the formula 247 associated with the purchase order status extracted insight 226 would involve a numerical comparison. Particularly, intended use classifier 145 may determine the numerical comparison would be used to check for compliance with the negotiated due-time shipping delay by comparing the numerical value of the negotiated timeframe set forth in document 310 to the actual due-time shipping delay. Additionally, intended use classifier 145 may determine the data requirement 254 used to process the formula 247 associated with the due-time shipping delay would require mathematical inputs of the delivery order status for determining which due-time shipping delay to consider from document 310, the order date for determining the date from which the shipping delay may be calculated, and the negotiated due-time shipping delay and actual due-time shipping delay for comparing whether the supplier has ensured good delivery.

As shown in FIG. 5B, upon determining whether the deliver order is an emergency or regular status, the next consideration is whether the supplier has exceeded the maximum amount of time to deliver goods from the due-time shipping delay set forth in document 310 depending on if it is an emergency order (48 hours due-time shipping delay from the order date) or regular status (5 hours due-time shipping delay from the order date). Depending on whether the supplier has exceeded the due-time shipping delay set forth in document 310, the intended use classifier 145 may apply penalties using a penalty coefficient.

Intended use classifier 145 may use a penalty computation KPI 242 and the sentence segment from section "3.3 Penalty" retrieved from process related data 228 during insight extraction 224 to determine the formula 247 associated with the penalty coefficient extracted insight 226. As shown in section "3.3 Penalty" of document 310, the penalty coefficient if the supplier fails to deliver the goods on time is the price of the undelivered units in addition to 10% of the price of the undelivered units. Accordingly, intended use classifier 145 may determine the formula 247 associated with the penalty coefficient extracted insight 226 is as follows:

Formula 247 (Penalty Coefficient)=(0.1*undelivered units*unit price)+(undelivered units*unit price)

Intended use classifier 145 may then use processing extraction 248 to extract the processing requirement 250 and data extraction 252 to extract the data requirement 254 for the formula 247 associated with the penalty coefficient extracted insight 226. Intended use classifier 145 may determine the processing requirement 250 for the formula 247 associated with the penalty coefficient extracted insight 226 would involve arithmetic operation. Particularly, intended use classifier 145 may determine the arithmetic operation for the penalty coefficient requires computing the price of undelivered goods and adding 10% of the price of the undelivered goods. This requires multiplication and addition arithmetic operators to determine the penalty coefficient. Additionally, intended use classifier 145 may determine the data requirement 254 used to process the formula 247 associated with the due-time shipping delay would require numerical mathematical inputs of the undelivered units and the unit price.

Figure 5C:
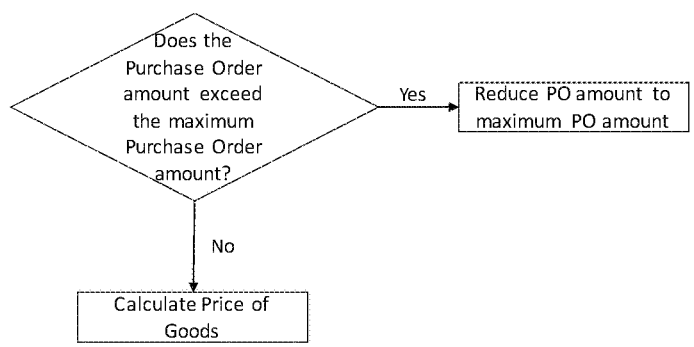

Referring to FIG. 5C, intended use classifier 145 may use machine learning techniques to determine the data requirement 254 and processing requirement 250 extracted from formula 247 for the extracted insight 226 associated with a purchase order. Intended use classifier 145 may first use the process related data 228 associated with terms and conditions 241 to determine the formula 247 for the extracted insight 226 for the purchase order amount and maximum purchase order amount. Intended use classifier 145 may use the sentence segment associated with section "2.1 Purchase Order Amount" from document 310 to extract formula 247 for the purchase order amount and maximum purchase order amount extracted insight 226.

Intended use classifier 145 may then use a check matching quantity KPI 242 associated with purchase order amounts generally extracted from public procurement contracts. The check matching quantity KPI 242 may validate if the purchase order amount matches the maximum and minimum quantity as agreed to contractually. This KPI 242 may evaluate this comparison by checking whether the purchase order amount is in a certain range for the minimum purchase order amount and maximum purchase order amount.

Using the check matching quantity KPI 242 and terms and conditions 241 sentence segment for section "2.1 Purchase Order Amount," intended use classifier 145 may use formula extraction 246 to determine the formula 247 for the purchase order amount and maximum purchase order amount extracted insight 226 would be as follows:

Formula 247 (Purchase Order Amount or Maximum Purchase Order Amount)=$f$ (Purchase Order Amount<Maximum Purchase Order Amount) then "does not exceed"

Intended use classifier 145 may then use processing extraction 248 to extract the processing requirement 250 and data extraction 252 to extract the data requirement 254 for the formula 247 associated with the purchase amount and maximum purchase amount extracted insight 226. Intended use classifier 145 may determine the processing requirement 250 for the formula 247 associated with the purchase order status extracted insight 226 would involve a numerical comparison. Particularly, intended use classifier 145 may determine the numerical comparison would be used to check whether the purchase order amount exceeds the negotiated maximum purchase order amount. Additionally, intended use classifier 145 may determine the data requirement 254 used to process the formula 247 would require mathematical inputs of the purchase order amount and maximum purchase order amount set forth in document 310.

As shown in FIG. 5C, upon confirming that the purchase order amount does not exceed the maximum purchase order amount set forth in document 310, the next consideration would be the calculation of the price of goods. Otherwise, the system 100 may recalculate the purchase order amount or reduce the purchase order amount to an amount below the maximum purchase order amount.

Intended use classifier 145 may use a price of goods KPI 242 and the sentence segment from section "2.2 Price of Goods" retrieved from process related data 228 during insight extraction 224 to determine the formula 247 associated with the price of goods extracted insight 226. As shown in section "2.2 Price of Goods" of document 310, the price of goods may be determined by multiplying the purchase order amount and the unit price. Accordingly, intended use classifier 145 may determine the formula 247 associated with the price of goods extracted insight 226 is as follows:

Formula 247 (Price of Goods)=Purchase Order Amount*Unit Price

Intended use classifier 145 may then use processing extraction 248 to extract the processing requirement 250 and data extraction 252 to extract the data requirement 254 for the formula 247 associated with the price of goods extracted insight 226. Intended use classifier 145 may determine the processing requirement 250 for the formula 247 associated with the price of goods extracted insight 226 would involve arithmetic operation. Particularly, intended use classifier 145 may determine the arithmetic operation for the price of goods requires computing the overall purchase order amount. This requires multiplication operators to determine the price of goods. Additionally, intended use classifier 145 may determine the data requirement 254 used to process the formula 247 associated with the price of goods would require the purchase order amount and the unit price.

FIG. 6 is an example table illustrating a system for determining the intended use classification for extracted insights from a document, according to some embodiments. FIG. 6 is described with reference to FIG. 1, FIG. 2, FIG. 3, FIG. 4, and FIG. 5A. Various privacy enhancing solutions (e.g., secure multi-party computation, symmetric encryption, garbled circuit, order-preserving encryption) have been developed to ensure compliance with data privacy and security policies and regulations. While these privacy enhancing solutions enable compliance with data privacy regulations, the techniques may each target the nature of protected data and its respective processing in a different and limited manner. Each privacy enhancing technique may be useful in some contexts while compromising the usability of protected data in other contexts. PET selector 130 may optimize compliance with data privacy regulations and the usability of protected data by automating selection of privacy enhancing techniques based on the intended usage of extracted insight 226. Using security classification 238, processing requirement 250, and data requirement 254 for extracted insight 226 from document 310, the PET selector 130 may then map these combined factors to the most appropriate privacy enhancing technique.

PET selector may use PET selection 256 to generate a PET insight list 258 mapping a selected privacy enhancing technique to extracted insight 226. The PET insight list 258 may also include the respective security classification 238, processing requirement 250, and/or data requirement 254 to the selected privacy enhancing technique for extracted insight 226. As shown in the PET insight list 258, when certain extracted insight 226 (e.g., contractor ID and supplier ID) is designated with a public security classification 238 and corresponds to no processing requirement 250, PET selector 130 may not map the extracted insight 226 to a privacy enhancing technique, according to some embodiments. This may be due to the public nature of the public procurement context in which encryption may not be needed where the extracted insight 226 is publicly disclosed.

On the other hand, the European Union Public Procurement Guidelines may defer to the GDPR in protecting certain personal identifiable information. Accordingly, the contractor phone number and delivery address were given a confidential security classification 238. In this case, PET selector 130 may map an extracted insight 226 with no processing requirement 250 and a confidential security classification 238 to the symmetric encryption privacy enhancing technique. Symmetric encryption uses the same key to encrypt and decrypt data and thereby both the supplier and contractor may possess the same secret key. Symmetric encryption may be beneficial where the security classification 238 is confidential because possessing one key for encryption and decryption may simplify the encryption process while providing data privacy and confidentiality without the complexity of multiple keys. Accordingly, this would allow the supplier to contact the contractor and deliver the supplies to the proper address without disclosing the contractor's personal identifiable information in violation of the GDPR and EU Public Procurement Guidelines.

In some embodiments, PET selector 130 may map an extracted insight 226 with a confidential security classification 238 with the numerical comparison processing requirement 250 to the order-preserving encryption privacy enhancing technique. Order-preserving encryption is a function that may preserve the numerical ordering of certain function inputs. PET selector 130 may determine the order-preserving encryption is most appropriate for usage with numerical comparison because it allows encrypted data to be directly applied to the comparison of operations without the need for decrypting the data, which may promote the efficiency of the numerical comparison while ensuring security and compliance with data privacy regulations. However, order-preserving encryption may not be useful for a different processing requirement 250 because it may not preserve the numerical ordering of certain function inputs because it may change the value of the inputs. In this case, order-preserving encryption allows for numerical comparisons for the purchase order amount, maximum purchase order amount, and due-time shipping delay extracted insight 226 without decrypting extracted insight 226.

In some embodiments, PET selector 130 may map an extracted insight 226 with a confidential security classification 238 with the arithmetic computation processing requirement 250 to the MPC encryption technique. MPC allows parties to jointly compute the value of a public function with its encapsulated private data while a party may maintain the confidentiality of its own function inputs. PET selector 130 may determine MPC is most appropriate for usage with arithmetic computation because the method partially conceals confidential data while computing a correct output with the confidential data from various sources. This may be compatible with an arithmetic operation because MPC calculates the output of the arithmetic operation from the function inputs. However, MPC may be less applicable with other processing requirements depending on the intended use context because other processing requirements may not require a customizable function for computing desired output values in accordance with particular function inputs. In this case, MPC enables the computation of the price of goods based on the purchase order amount and unit price and the computation of the penalty coefficient based on the number of undelivered goods and unit price. MPC may enable the computation of the price of goods and penalty coefficient extracted insight 226 while still maintaining the confidentiality of the function inputs.

Finally, in some embodiments, PET selector 130 may map an extracted insight 226 with a confidential security classification 238 and Boolean comparison processing requirement 250 to the garbled circuit encryption technique. Garbled circuit enables two-party secure computation in which two mistrusting parties can jointly evaluate a function over their respective private inputs without the presence of a trusted third party. Within the garbled circuit protocol, the function is described as a Boolean circuit which necessitates the use of Boolean comparison. Through the confidential transfer, both parties may obtain an output without seeing the other party's confidential input. PET selector 130 may determine that the garbled circuit is inapplicable to a different processing requirement 250 such as the arithmetic operation because the technique requires a Boolean operator. In this case, garbled circuit may enable system 100 to check the binary value of the delivery order status to determine whether the due-time shipping delay has exceeded the negotiated shipping delay and whether penalties should be applied.

The mapping exemplified in this FIG. 6 is used for illustration purposes only, and depending on the intended usage of extracted insight 226 in a document 210, PET selector 130 may map the extracted insight to the most appropriate privacy enhancing technique.

FIG. 7 is an example table illustrating a system for encrypting extracted insights using corresponding selected privacy enhancing techniques, according to some embodiments. FIG. 7 is described with reference to FIG. 1, FIG. 2, FIG. 3, FIG. 4, FIG. 5A, and FIG. 6. Insight encryptor 160 may execute the selected privacy enhancing techniques corresponding to extracted insight 226. The privacy enhancing technique for the extracted insight may ensure the extracted insight complies with data privacy regulations and other confidentiality concerns based on its respective security classification while still enabling the processing of the data based on the unique processing requirements of the extracted insight.

Insight encryptor 160 may use data requirement 254 to apply the function input parameters to the selected privacy enhancing technique for extracted insight 226. Insight encryptor 160 may then process and encrypt extracted insight 226 based on its respective selected privacy enhancing technique. The results from processing the privacy enhancing technique corresponding to extracted insight 226 may be protected insight 262. Protected insight 262 may be the encrypted value of extracted insight 226. Protected insight 262 may be the resulting values from processing formula 254 based on the data requirement 254 for extracted insight 226. Protected insight 262 may include the value of extracted insight 226 in which insight encryptor 160 did not execute a corresponding privacy enhancing technique. Insight encryptor 160 may then store protected insight 262 in the secure extracted insights database 170. Privacy preserving credentials may be generated to protect protected insight 262.

An extracted insight 226 with a security classification 238 designated as public and requiring no processing requirement may not require processing or encryption. As shown in FIG. 7, insight encryptor 160 may not apply a privacy enhancing technique for the contractor ID and supplier ID extracted insight 226 because its security classification 238 is designated as public and requires no further processing. Accordingly, the supplier, contractor, and public can gain access to the contractor ID and supplier ID from the secure extracted insights database 170 and would be able to see that the contractor ID is 65462 and the supplier ID is 58948.

On the other hand, EU Public Procurement Guidelines encourages compliance with the GDPR. Therefore, any personal identifiable information should be encrypted and only disclosed as necessary. Accordingly, because the security classification 238 for the extracted insight 226 for the contractor's personal identifiable information including the contractor phone number and contractor delivery address are confidential, only the supplier may access this information to ensure good delivery to the contractor. Accordingly, the supplier would be able to access the contractor's phone number, 345-164-6534, and the contractor's delivery address 564 K. St. Alexandria, Virginia 22314. The public would not be able to access this information. However, because this information did not require any additional processing, the phone number and delivery address are still the same values as shown in document 310.

For each remaining extracted insight 226, the security classification 238 is designated as confidential. Accordingly, the corresponding protected insight 262 is restricted to only the contractor and/or supplier. For the purchase order information, only the supplier and/or contractor may access extracted insight 226 associated with the purchase order data classification 236. The purchase order amount and maximum purchase amount both require a numerical comparison to determine whether the purchase order amount exceeds the maximum purchase amount. Therefore, the data requirement 254 required for the purchase order amount and maximum purchase order amount would be the purchase order amount from document 310, 999 units, and the maximum purchase order amount set forth in document 310, 1999 units. Insight encryptor 160 may use order-preserving encryption to process the numerical comparison of these values while restricting the confidentiality of these values to the contractor and supplier. Accordingly, the supplier and contractor can access this information and confirm that the purchase order amount, 999 units, does not exceed the maximum purchase order amount, 1999 units, while protecting this data from access to the public.

Upon confirming the purchase order amount does not exceed the maximum purchase amount, insight encryptor 160 may apply the MPC privacy enhancing technique to calculate the price of goods. Insight encryptor 160 may apply MPC to calculate the price of goods by multiplying the purchase order amount, 999 units, with the unit price, $10, to determine the price of goods output would result in $9990. Only the contractor can access this information to determine its payment obligations to the suppliers without disclosing this information to the public. Therefore, the contractor can obtain the price of the goods while the supplier can maintain confidentiality of the purchase order amount and/or unit price.

For each extracted insight 226 with the contractual information data classification 236, only the contractor and supplier may access protected insight 262. Insight encryptor 160 may process garbled circuit to determine the delivery order status by completing a Boolean comparison of the emergency delivery order status and regular delivery order status. Only the supplier and contractor can gain access to the delivery order status.

Depending on the delivery order status extracted insight 226, insight encryptor 160 perform order-preserving encryption for the due-time shipping delay extracted insight 226 by comparing the number of days or hours that have passed from the order date to the due-time shipping delay set forth in document 310 to determine if any penalties may be applied. Only the supplier and contractor can determine whether the supplier has exceeded the due-time shipping delay in delivering the supplies to the contractor.

Depending on whether the supplier has exceeded the due-time shipping delay in delivering the supplies to the contractor, the supplier and contractor may gain access to the penalty coefficient protected insight 262 from secure extracted insights database 270. Insight encryptor 160 may process MPC to determine the penalty coefficient extracted insight 226. Insight encryptor 160 may calculate the penalty coefficient based on the number of undelivered units and the unit price in addition to 10% of the number of undelivered units and the unit price. Only the supplier and contractor may retrieve the penalty coefficient without gaining access to the number of undelivered units and the unit price, while the public can gain information to neither the penalty coefficient, number of undelivered units, nor the unit price.

By selecting a privacy enhancing technique most appropriate for the security classification and processing requirement of extracted insight 226, compliance with data privacy regulations and data security is strengthened while increasing the usability of protected data.

Figure 8:
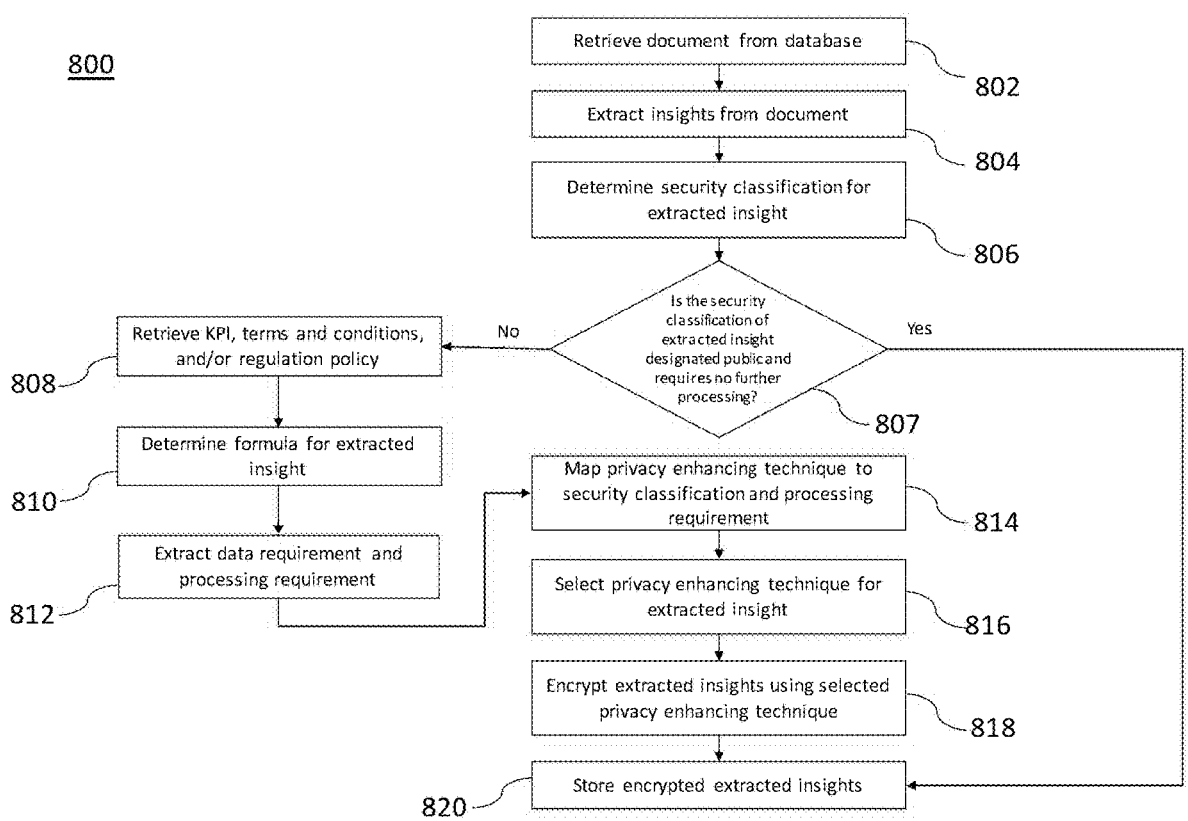
FIG. 8 is a flowchart illustrating a method for intended usage driven data privacy enhancing technique selection, according to some embodiments.

FIG. 8 is a flowchart illustrating a method for intended usage driven privacy enhancing technique selection, according to some embodiments. FIG. 8 is described with reference to FIGS. 1-7. Method 800 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 8, as will be understood by a person of ordinary skill in the art.

At 802, insight extractor 120 may retrieve document 210 from document database 110. Document database 110 may be a database that stores documents including document 210. System 100 may retrieve document 210 from document database 110 to perform insight extraction 224, PET selection model 230, and insight encryption. Insight extractor 120 may retrieve documents from document database 110.

At 804, insight extractor 120 may use insight extraction model 220 to extract extracted insight 226 from document 210. Insight extractor 120 may perform document segmentation 222 and insight extraction 224 to retrieve extracted insight 226. Document segmentation 222 includes data preparation and data cleaning techniques known to a person of ordinary skill in the art. Prior to retrieving any particular data from document 210, insight extractor 120 may cleanse the data in document 210 by removing or correcting data in document 210 that would place document 210 in condition for further insight extraction 224. Upon cleansing the data in document 210, insight extractor 120 may perform document segmentation 222 by using data preparation techniques. These data preparation techniques can include document segmentation techniques such as sentence classifier model 223. Insight extractor 120 may use sentence classifier model 223 to split document 210 into segments classifying various sentences. Each segment may have a relevant meaning or purpose to enable insight extractor 120 to complete insight extraction 224. While insight extractor 120 may use sentence classifier model 223 to complete document segmentation 222, insight extractor 120 may also split document 210 into segments categorized by words, sentences, topics, phrases, or other units of information depending on the nature of the extracted insight 226 to be retrieved.

By performing document segmentation 222, insight extractor 120 may have placed document 210 in condition to process insight extraction model 224 in order to extract insights from document 210. Insight extractor 120 may extract insights from document 210 using artificial intelligence techniques, including, but not limited to, K-nearest neighbors, regression, or natural language processing. Insight extractor 120 may use any data mining techniques for extracting insights from document 210 known to a person of ordinary skill in the art. Upon performing document segmentation 222 and applying insight extraction 224, insight extractor 120 may retrieve extracted insight 226 from document 210.

At 806, data security classifier 135 may perform security classification model 235 to classify the security level for extracted insight 226. Security classification 238 may include data classification 236 and security policy 239. Data security classifier 135 may perform data classification model 237 using artificial intelligence techniques known to a person of ordinary skill in the art to determine the data classification 236 for extracted insight 226.

Data security classifier 135 may use a rule-based security classification model 235 to classify the level of security for extracted insight 226. Security Selection Model 235 may include the data classification 236 for a particular extracted insight 226 to determine security classification 238. Security classification model 235 may also be based on a security policy 239 for determining the security classification 238 of extracted insight 226. Using the data classification 236 and/or security policy 239 of extracted insight 226, data security classifier 135 may determine the security classification 238 for extracted insight 226.

At 807, intended use classifier 145 may determine whether the security classification 238 for extracted insight 226 is designated public and requires no further processing. According to some embodiments, if intended use classifier 145 determines the security classification 238 for certain extracted insight 226 is designated as public and requires no further processing, system 100 proceeds to 820. According to some embodiments, if intended use classifier 145 determines the security classification 238 for certain extracted insight 226 is not designated as public or requires further processing, system 100 proceeds to 808.

At 808, intended use classifier 145 may retrieve terms and conditions 241, KPI 242, and/or regulation policy 243 to determine a formula 247. Intended use classifier 145 may determine the formula 247 based on pre-determined KPI 242. KPI 242 may be a mathematical function or a formula describing a calculation, and various other metadata associated with KPI 242. KPI 242 may represent an integer, decimal, floating point number, string, or other text. Metadata associated with KPI 242 may include contextual information and a formal language query (or queries) used to generate KPI 242. According to an embodiment, KPI 242 may be data driven indicators statically drawn from data across a wide-array of data-driven applications. According to some embodiments, KPI 242 may be dynamically retrieved using machine learning techniques to extract mathematical expressions from textual sources such as document 210.

Intended use classifier 145 may retrieve terms and conditions 241 to determine a formula 247 associated with extracted insight 226. Intended use classifier 145 may use the process related data 228 associated with terms and conditions 241 to determine the formula 247 associated with extracted insight 226. Intended use classifier 145 may associate the segments extracted from document segmentation 222 to identify the relevant terms and conditions associated with extracted insight 226.

Intended use classifier 145 may retrieve regulation policy 243 to determine a formula 247 for extracted insight 226. Intended use classifier 145 may analyze the requirements to comply with regulation policy 243 in deriving formula 247. In some embodiments, regulation policy 243 may be the same as security policy 239. In some embodiments, regulation policy 243 may be informed by security classification 238 for extracted insight 226.

At 810, intended use classifier 145 may determine a formula 247 associated with extracted insight 226. Intended use classifier 145 may perform formula extraction 246 to extract a mathematical expression from KPI 242. Formula 247 may be the mathematical expression intended use classifier 145 extracted from KPI 242. Intended use classifier 145 may determine formula 247 for extracted insight 226 based on the retrieved terms and conditions 241 of document 210, KPI 242, and/or any applicable regulation policy 243.

At 812, intended use classifier 145 may perform processing extraction 248 to determine the processing requirement 250 and data extraction 252 to determine data requirement 254 for extracted insight 226. Intended use classifier 145 may use formula 247 to determine processing requirement 250 and data requirement 254 for extracted insight 226. Processing extraction 248 and data extraction 252 may incorporate machine learning techniques including natural language processing to extract processing requirement 250 and data requirement 254. Processing requirement 250 may be the performed operation represented by formula 247 (e.g., sum, average, mean, calculation). Data requirement 254 may be the function input parameters required to process formula 247.

At 814, PET selector 130 may map security classification 238 and processing requirement 250 to a relevant privacy enhancing technique for extracted insight 226. Depending on the processing requirement (e.g., numerical comparison, arithmetic operation, Boolean comparison) and the security classification 238 of extracted insight 226 (e.g., public, private, confidential, protected), PET selector 130 may map the appropriate privacy enhancing technique to extracted insight 226 that ensures compliance with the appropriate data privacy regulation while contextualizing the privacy enhancing technique to the processing requirement to increase the usability of protected data and reduce the limited post-processing capability of legacy privacy enhancing systems.

At 816, PET selector 130 may select the appropriate privacy enhancing technique for extracted insight 226. After PET selector 130 maps extracted insight 226 to an appropriate privacy enhancing technique, PET selector 130 may select the mapped privacy enhancing technique and may generate a PET insight list 258 representing a list of each extracted insight 226 with its mapping to the relevant privacy enhancing technique.

At 818, insight encryptor 160 may process and encrypt the selected privacy enhancing techniques for extracted insight 226. Once insight encryptor 160 executes the selected privacy enhancing technique corresponding to extracted insight 226, the results may be protected insight 262. Protected insight 262 may be the encrypted value of extracted insight 226. Protected insight 262 may be the resulting values from processing formula 254 based on the data requirement 254 for extracted insight 226. Protected insight 262 may include the value of extracted insight 226 in which insight encryptor 160 did not execute a corresponding privacy enhancing technique. Privacy preserving credentials may be generated to protect protected insight 262. Insight encryptor 160 may use data requirement 254 to pass the function input parameters to the selected privacy enhancing technique for extracted insight 226. Insight encryptor 160 may then process and encrypt extracted insight 226 based on its respective selected privacy enhancing technique.

At 820, insight encryptor 160 may store protected insight 262 in secure extracted insights database 170. Protected insight 262 may only be accessible to those permitted under security classification 238 for extracted insight 226. Insight encryptor 160 may perform insight protection 260 by storing protected insights 262 in secure extracted insights database 170.

Figure 9:
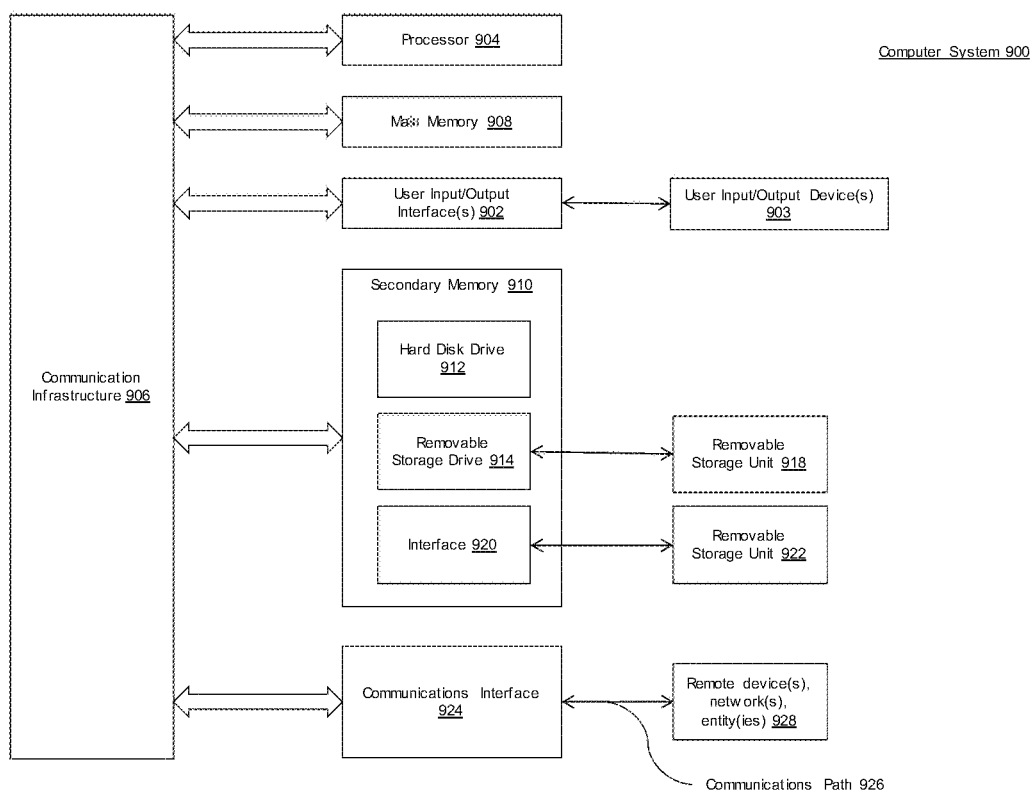
FIG. 9 is an example computer system useful for implementing various embodiments.

Various embodiments can be implemented, for example, using one or more computer systems, such as computer system 900 shown in FIG. 9. FIG. 9 is described with reference to FIGS. 1-8. Computer system 900 can be used, for example, to implement method 800 of FIG. 800. For example, computer system 900 can implement and execute a set of instructions comprising extract insights from a document 210, determine a security classification 238 for extracted insight 226, determine a formula 247 for extracted insight 226, extract a processing requirement and data requirement from formula 247 for extracted insight, and select a privacy enhancing technique mapped to the security classification and processing requirement for extracted insight 226. Computer system 900 can be any computer capable of performing the functions described herein.

Computer system 900 can be any well-known computer capable of performing the functions described herein.

Computer system 900 includes one or more processors (also called central processing units, or CPUs), such as a processor 904. Processor 904 is connected to a communication infrastructure or bus 906.

One or more processors 904 may each be a graphics processing unit (GPU). In an embodiment, a GPU is a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 900 also includes user input/output device(s) 903, such as monitors, keyboards, pointing devices, etc., that communicate with communication infrastructure 906 through user input/output interface(s) 902.

Computer system 900 also includes a main or primary memory 908, such as random access memory (RAM). Main memory 908 may include one or more levels of cache. Main memory 908 has stored therein control logic (i.e., computer software) and/or data.

Computer system 900 may also include one or more secondary storage devices or memory 910. Secondary memory 910 may include, for example, a hard disk drive 912 and/or a removable storage device or drive 914. Removable storage drive 914 may be a floppy disk drive, a magnetic tape drive, a compact disk drive, an optical storage device, tape backup device, and/or any other storage device/drive.

Removable storage drive 914 may interact with a removable storage unit 918. Removable storage unit 918 includes a computer usable or readable storage device having stored thereon computer software (control logic) and/or data. Removable storage unit 918 may be a floppy disk, magnetic tape, compact disk, DVD, optical storage disk, and/any other computer data storage device. Removable storage drive 914 reads from and/or writes to removable storage unit 918 in a well-known manner.

According to an exemplary embodiment, secondary memory 910 may include other means, instrumentalities or other approaches for allowing computer programs and/or other instructions and/or data to be accessed by computer system 900. Such means, instrumentalities or other approaches may include, for example, a removable storage unit 922 and an interface 920. Examples of the removable storage unit 922 and the interface 920 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 900 may further include a communication or network interface 924. Communication interface 924 enables computer system 900 to communicate and interact with any combination of remote devices, remote networks, remote entities, etc. (individually and collectively referenced by reference number 928). For example, communication interface 924 may allow computer system 900 to communicate with remote devices 928 over communications path 926, which may be wired and/or wireless, and which may include any combination of LANs, WANs, the Internet, etc. Control logic and/or data may be transmitted to and from computer system 900 via communication path 926.

In an embodiment, a tangible, non-transitory apparatus or article of manufacture comprising a tangible, non-transitory computer useable or readable medium having control logic (software) stored thereon is also referred to herein as a computer program product or program storage device. This includes, but is not limited to, computer system 900, main memory 908, secondary memory 910, and removable storage units 918 and 922, as well as tangible articles of manufacture embodying any combination of the foregoing. Such control logic, when executed by one or more data processing devices (such as computer system 900), causes such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 9. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A computer-implemented method, comprising:
extracting a plurality of insights from a document;
determining a security classification for at least one of the plurality of insights;
extracting a formula for the at least one of the plurality of insights from text of the document;
identifying a processing requirement and a data requirement corresponding to the formula, wherein the processing requirement specifies a type of operation of the formula, the type of operation being selected from a group that comprises Boolean comparison, numerical comparison, and arithmetic operation, and wherein the data requirement specifies one or more input parameters of the formula;

mapping the security classification and the type of operation specified by the processing requirement to a privacy enhancing encryption technique; and based on the one or more input parameters specified by the data requirement, executing the privacy enhancing encryption technique corresponding to the security classification and the type of operation specified by the processing requirement for the at least one of the plurality of insights, wherein at least one of the extracting the plurality of insights, determining the security classification, extracting the formula, identifying, mapping, and executing are performed by one or more computers.

2. The method of claim 1, further comprising:
segmenting the document using a document segmentation model,
wherein the segmenting is performed by the one or more computers.

3. The method of claim 1, further comprising:
determining a data classification for the at least one of the plurality of insights,
wherein the determining the data classification is performed by the one or more computers.

4. The method of claim 1, further comprising:
extracting process related data from the document, wherein the process related data includes data related to terms and conditions of the document; and
determining the formula for the at least one of the plurality of insights based upon at least the process related data related to the terms and conditions of the document,
wherein at least one of the extracting the process related data and determining the formula are performed by the one or more computers.

5. The method of claim 1, further comprising:
retrieving a plurality of key performance indicators associated with the at least one of the plurality of insights; and
determining the formula for the at least one of the plurality of insights based upon at least one of the plurality of key performance indicators associated with the at least one of the plurality of insights,
wherein at least one of the retrieving the plurality of key performance indicators and determining the formula are performed by the one or more computers.

6. The method of claim 1, further comprising:
analyzing a regulation policy associated with the at least one of the plurality of insights; and
determining the formula for the at least one of the plurality of insights based upon at least the regulation policy associated with the at least one of the plurality of insights,
wherein at least one of the analyzing and determining the formula are performed by the one or more computers.

7. The method of claim 1, further comprising:
retrieving a plurality of protected insights, wherein the plurality of protected insights further comprises the at least one of the plurality of insights processed using the privacy enhancing encryption technique corresponding to the at least one of the plurality of insights; and
storing the plurality of protected insights in a database,
wherein at least one of the retrieving the plurality of protected insights and storing are performed by the one or more computers.

8. A system, comprising:
a memory; and
at least one processor coupled to the memory and configured to:
extract a plurality of insights from a document;
determine a security classification for at least one of the plurality of insights;
extract a formula for the at least one of the plurality of insights from text of the document;
identify a processing requirement and a data requirement corresponding to the formula, wherein the processing requirement specifies a type of operation of the formula, the type of operation being selected from a group that comprises Boolean comparison, numerical comparison, and arithmetic operation and wherein the data requirement specifies one or more input parameters of the formula;
map the security classification and the type of operation specified by the processing requirement to a privacy enhancing encryption technique; and
based on the one or more input parameters specified by the data requirement, execute the privacy enhancing encryption technique corresponding to the security classification and the type of operation specified by the processing requirement for the at least one of the plurality of insights.

9. The system of claim 8, wherein the at least one processor is configured to:
segment the document using a document segmentation model.

10. The system of claim 8, wherein the at least one processor is configured to:
determine a data classification for the at least one of the plurality of insights.

11. The system of claim 8, wherein the at least one processor is configured to:
extract process related data from the document, wherein the process related data includes data related to terms and conditions of the document; and
determine the formula for the at least one of the plurality of insights based upon at least the process related data related to the terms and conditions of the document.

12. The system of claim 8, wherein the at least one processor is configured to:
retrieve a plurality of key performance indicators associated with the at least one of the plurality of insights; and
determine the formula for the at least one of the plurality of insights based upon at least one of the plurality of key performance indicators associated with the at least one of the plurality of insights.

13. The system of claim 8, wherein the at least one processor is configured to:
analyze a regulation policy associated with the at least one of the plurality of insights; and
determine the formula for the at least one of the plurality of insights based upon at least the regulation policy associated with the at least one of the plurality of insights.

14. The system of claim 8, wherein the at least one processor is configured to:
retrieve a plurality of protected insights, wherein the plurality of protected insights further comprises the at least one of the plurality of insights processed using the privacy enhancing encryption technique corresponding to the at least one of the plurality of insights; and store the plurality of protected insights in a database.

15. A non-transitory computer-readable medium having instructions stored thereon that, when executed by at least one computing device, cause the at least one computing device to perform operations comprising:

extracting a plurality of insights from a document;

determining a security classification for at least one of the plurality of insights;

extracting a formula for the at least one of the plurality of insights from text of the document;

identifying a processing requirement and a data requirement corresponding to the formula, wherein the processing requirement specifies a type of operation of the formula, the type of operation being selected from a group that comprises Boolean comparison, numerical comparison, and arithmetic operation and wherein the data requirement specifies one or more input parameters of the formula;

mapping the security classification and the type of operation specified by the processing requirement to a privacy enhancing encryption technique; and based on the one or more input parameters specified by the data requirement, executing the privacy enhancing encryption technique corresponding to the security classification and the type of operation specified by the processing requirement for the at least one of the plurality of insights.

16. The non-transitory computer-readable medium of claim 15, the operations further comprising:

segmenting the document using a document segmentation model.

17. The non-transitory computer-readable medium of claim 15, the operations further comprising:

determining a data classification for the at least one of the plurality of insights.

18. The non-transitory computer-readable medium of claim 15, the operations further comprising:

extracting process related data from the document, wherein the process related data includes data related to terms and conditions of the document; and determining the formula for the at least one of the plurality of insights based upon at least the process related data related to the terms and conditions of the document.

19. The non-transitory computer-readable medium of claim 15, the operations further comprising:

retrieving a plurality of key performance indicators associated with the at least one of the plurality of insights; and determining the formula for the at least one of the plurality of insights based upon at least one of the plurality of key performance indicators associated with the at least one of the plurality of insights.

20. The non-transitory computer-readable medium of claim 15, the operations further comprising:

analyzing a regulation policy associated with the at least one of the plurality of insights; and determining the formula for the at least one of the plurality of insights based upon at least the regulation policy associated with the at least one of the plurality of insights.

* * * * *